United States Patent [19]

Kraft et al.

[11] Patent Number: 4,542,192
[45] Date of Patent: Sep. 17, 1985

[54] REACTIVE HARDENABLE POLYMER MIXTURE AND PROCESS FOR THE PREPARATION OF HARDENED PRODUCTS THEREFROM

[75] Inventors: Kurt Kraft; Gerd Walz, both of Wiesbaden; Thaddäus Wirth, Heidenrod, all of Fed. Rep. of Germany

[73] Assignee: Hoechst Aktiengesellschaft, Frankfurt, Fed. Rep. of Germany

[21] Appl. No.: 382,419

[22] Filed: May 26, 1982

Related U.S. Application Data

[63] Continuation of Ser. No. 150,706, May 19, 1980, abandoned, which is a continuation of Ser. No. 961,556, Nov. 17, 1978, abandoned.

[30] Foreign Application Priority Data

Dec. 7, 1977 [DE]  Fed. Rep. of Germany ....... 2754399
Mar. 18, 1978 [DE]  Fed. Rep. of Germany ....... 2811914

[51] Int. Cl.[4] .................... C08G 85/00; C08L 63/00
[52] U.S. Cl. .................... 525/438; 525/58; 525/121; 525/178; 525/419; 525/508; 528/361
[58] Field of Search ............ 525/438, 58, 172

[56] References Cited

U.S. PATENT DOCUMENTS

| | | | |
|---|---|---|---|
| 3,397,254 | 8/1968 | Wynstra | 525/438 |
| 3,502,620 | 3/1970 | Caldwell | 525/438 |
| 3,978,154 | 8/1976 | Yukuta | 525/438 |
| 4,093,675 | 6/1978 | Schure | 525/438 |
| 4,147,737 | 4/1979 | Sein | 525/438 |

*Primary Examiner*—Lewis T. Jacobs
*Assistant Examiner*—A. L. Carrillo
*Attorney, Agent, or Firm*—Quaintance & Murphy

[57] ABSTRACT

A reactive hardenable polymer mixture which comprises
(A) at least one epoxy compound and
(B) at least one polycarboxylic acid compound in the form of a component selected from the group consisting of
(a) at least one compound of formula

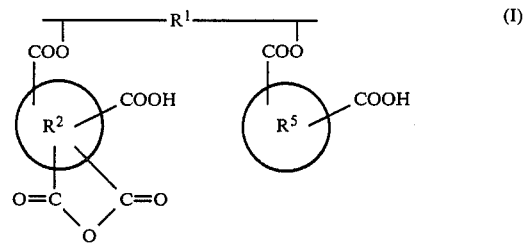

(I)

and

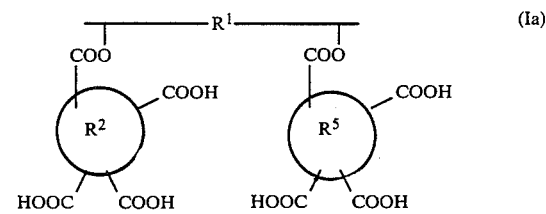

(Ia)

wherein
$R^1$ is a radical derived from at least one polymeric product containing hydroxy groups selected from the group consisting of a polymerization and a condensation product and a combination thereof in the form of polyesters, polymers each having a hydroxy number between 20 and 300, phenol resins having a hydroxy number between 100 and 800 and combinations thereof,
$R^2$ is a radical of an at least tetrabasic cyclic carboxylic acid having at least one COOH-group in an o- or peri-position to the ester bond,
$R^5$ is a radical of an at least dibasic cyclic carboxylic acid having at least one COOH-group in o- or peri-position to the ester bond and $R^5$ may also be as defined for $R^2$;
(b) at least one at least tetrabasic cyclic carboxylic acid compound having 2 carboxylic groups in an o- or peri-position or at least one anhydride group or both together with at least one of the OH-group containing compounds from which the above defined group $R^1$ is derived;
(c) a least one compound corresponding to formula (I) or (Ia) as defined under (a) but with the proviso that the anhydride groups are replaced at least partially by a free acid or ester group or by both;
(d) at least one compound as defined under (b) wherein the anhydride groups of the polycarboxylic acid compounds are replaced least partially by a free acid or ester group by both; and
(e) any combination of (a) to (d), a process for the preparation of hardened products in hardening said composition.

16 Claims, No Drawings

REACTIVE HARDENABLE POLYMER MIXTURE AND PROCESS FOR THE PREPARATION OF HARDENED PRODUCTS THEREFROM

This application is a continuation of U.S. application Ser. No. 06/150,706, filed May 19, 1980, now abandoned, which in turn is a continuation of U.S. application No. 05/961,556, filed Nov. 17, 1978, now abandoned.

The invention relates to a reactive hardenable polymer mixture and to a process for the preparation of hardened products therefrom.

Compounds containing an oxirane ring are known to react with compounds containing carboxyl groups to cause ring opening. However, when compounds are used having more than one oxirane ring and more than one carboxyl group, the reaction gives rise to the formation of polymeric esters containing secondary hydroxyl groups. Polymers produced by such a process have for a long time been known as "acid-hardening epoxy resins".

However, it is also known that this polymer formation may take place at a sufficiently high rate and with the avoidance of undesirable secondary reactions (e.g. ether formation) only at temperatures above 140° C. This results in a considerable restriction of the applicability of "acid hardening" of epoxy resins. It has hitherto been proposed to react at temperatures below 120° C. systems containing oxirane rings with special polycarboxylic acids whose reactivity as hardeners goes far beyond that of previously known polycarboxylic acids. Although this proposal represents a considerable advance, it is desirable to improve such systems still further.

The hardening of epoxidised oils by reaction with halogenated dicarboxylic acids at room temperatures is also known. However, this process has the disadvantage that the acids cannot be employed in a sufficiently high concentration, since they tend to crystallise out of the system.

In addition, the reaction of alkyd resins with halogenated dicarboxylic acids or anhydrides thereof and the further reaction of the products thus obtained with epoxidised fatty acid esters have already been described. This process relates only to water-soluble systems which, however, always require elevated temperatures for hardening.

Solvent-containing systems of this type, which are likewise known, also require elevated temperatures for hardening. Since both of these latter systems contain a halogenated dicarboxylic acid component, they also have the above-mentioned disadvantages.

We have now found a reactive hardenable polymer system having an unusually high reactivity and which may be hardened at considerably lower temperatures than the systems above-mentioned.

Thus, according to one aspect of the present invention there is provided a reactive hardenable polymer mixture based on (A) one or more epoxy compounds, and (B) one or more polycarboxylic acid compounds characterised in that the mixture contains as carboxylic acid compounds (B) at least one component selected from the group consisting of (a) at least one compound of formula

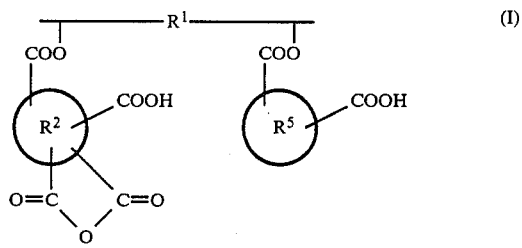

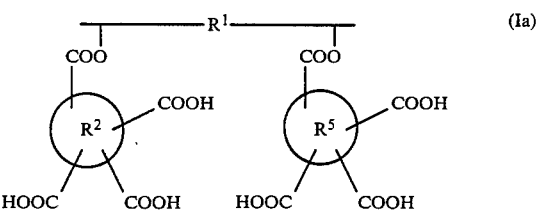

[in which $R^1$ represents a radical derived from at least one polymeric polymerisation and/or condensation product containing OH groups selected from polyesters, polymers, (both having an OH number of 20 to 300, preferably 40 to 220X, and phenolic resins (having an OH number of 100 to 800, preferably 150 to 300);

$R^2$ represents the radical of an at least tetrabasic cyclic carboxylic acid having at least one COOH group in an o- or peri-position relative to the ester bond;

$R^5$ represents the radical of an at least dibasic cyclic carboxylic acid having at least one COOH group in an o- or peri-position relative to the ester bond, and $R^5$ may also be as defined for $R^2$];

(b) one or more at least tetrabasic cyclic carboxylic acid compounds having two carboxyl groups in an o- or peri-position and/or having an anhydride group, together with at least one of the OH—group containing compounds from which the above defined group $R^1$ is derived, and (c) at least one compound of formula (I) or (Ia) as defined above and/or at least one compound as defined in (b) above in which the anhydride groups of the polycarboxylic acid compound are replaced at least partially by free acid and/or ester groups.

The term "carboxylic acid compounds" as used herein is therefore intended to include compounds which contain free carboxyl, anhydride and/or ester groups, either alone or in combination.

In compounds of formula (I) or (Ia) it will be appreciated that $R^2$ and $R^5$ may be the same or different $R^2$ and $R^5$ may, for example, be radicals of at least one of the following anhydrides wherein the free valencies in formulae (II) to (VI) are bound to COOH—groups in o- or peri-position, ester groups or to an anhydride group.

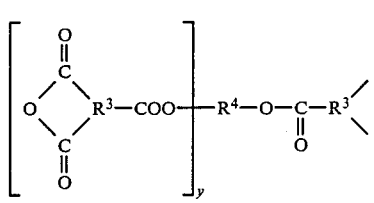 (II)
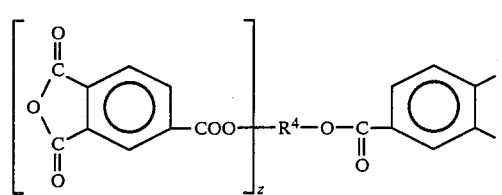 (IIa)
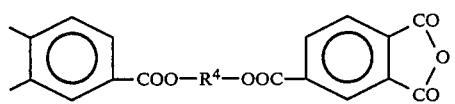 (IIb)
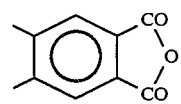 (III)
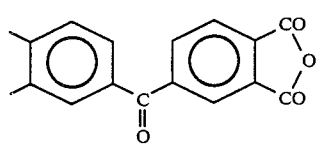 (IV)
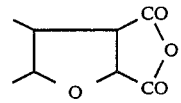 (V)
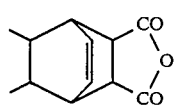 (Va)
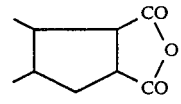 (Vb)
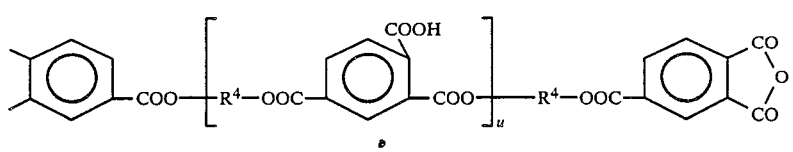 (VI)
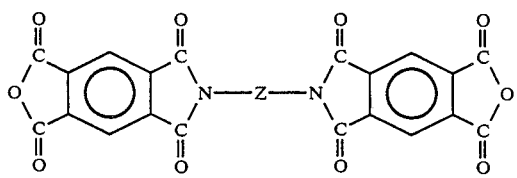 (VII)
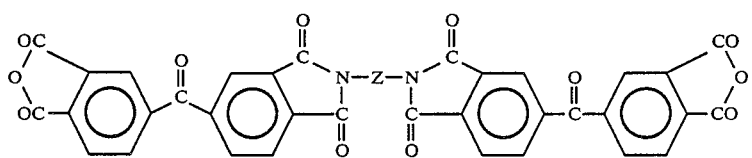 (VIII)
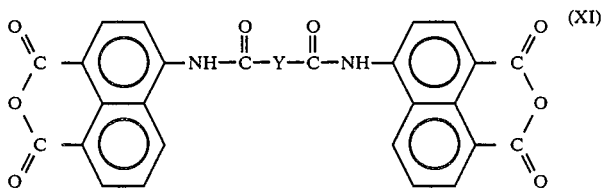 (XI)
wherein
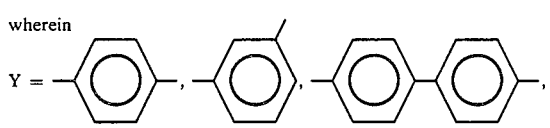 (XII)
$Y = $ 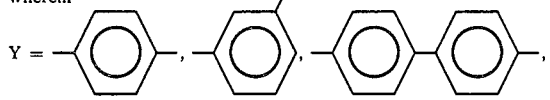,
$(CH_2)_p$ (p = 2–8)

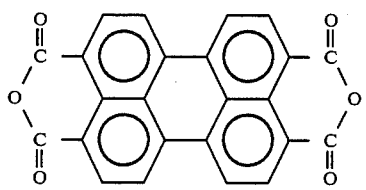 (XIII)

-continued

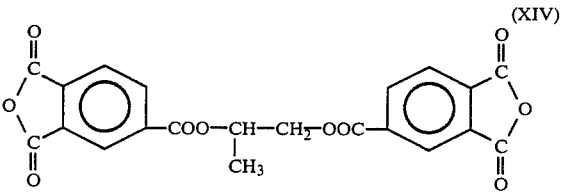 (XIV)

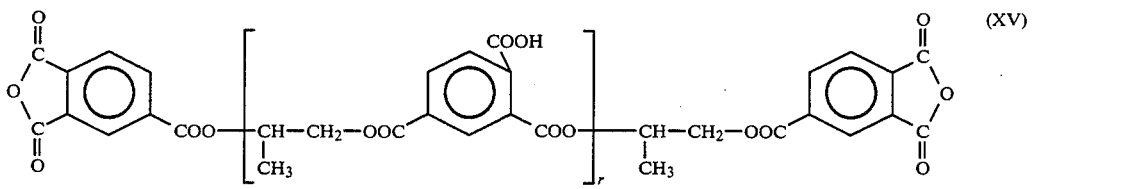 (XV)

In the above formulae it should be noted that the anhydride group bound to $R^1$ is also shown.

In the above formulae:

$R^3$ represents a benzene, naphthalene, phenanthrene, aminonaphthalene, bicyclooctene, cyclopentane or tetrahydrofuran group;

$R^4$ represents a bi- to pentavalent aliphatic hydrocarbon group having 1 to 28, desirably 1 to 15, and preferably 2 to 8 carbon atoms (which may be optionally interrupted at least once by oxygen bridges or by —HC=CH—groups and is optionally substituted by an ester group with 1 to 6, preferably 1 to 3 carbon atoms, or with a COOH group), an aromatic group having 6 to 43 carbon atoms of formula

 (XVI)

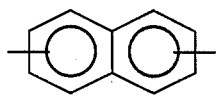 (XVII)

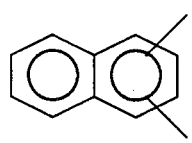 (XVIII)

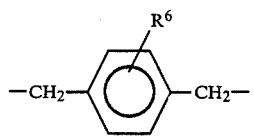 (XIX)

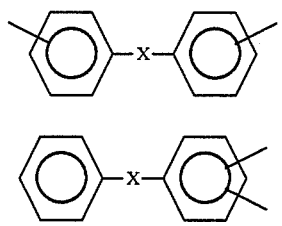 (XX)

(XXI)

[which may be optionally substituted by at least one group $R^6$ selected from alkyl or alkoxy groups having 1 to 6 carbon atoms, halogen atoms, piperazine groups or groups of formula

 (XXIII)

 (XXIV)

and wherein X is a group of formula

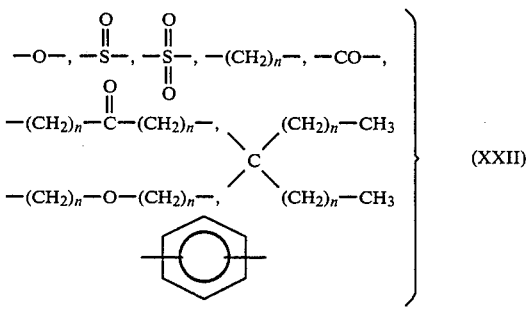 (XXII)

(wherein n is an integer of from 1 to 8)];

Z represents a group of formula —$(CH_2)_m$— (in which m is an integer of from 2 to 8) or of formula

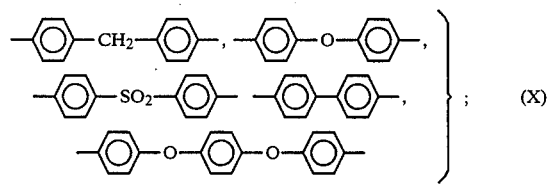 (X)

X represents a group of formula

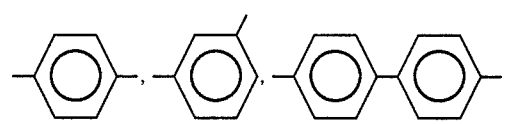

or —$(CH_2)_p$— (in which p is an integer of from 2 to 8);

r and u each represent an integer of from 1 to 8, preferably 1 to 4;

y represents an integer of from 1 to 3; and z represents 1 or 2.

Examples of radicals R⁴ in the above formulae are groups of formula —(CH₂)ₛ— (in which s is from 2 to 10, preferably 2 to 4),

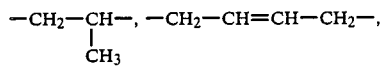

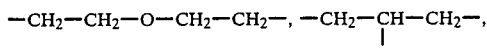

and also those of formula XXII.

R⁵ may also represent, apart from the radicals mentioned for R², a radical, for example, derived from a dicarboxylic or tricarboxylic acid system e.g. a radical derived from trimellitic acid, phthalic acid, 4-aminophthalic acid, tetrabromophthalic acid, tetrachlorophthalic acid, endomethylenetetrahydrophthalic acid, hexachloren-domethylenetetrahydrophthalic acid, naphthalic acid and 4-aminonaphthalic acid.

The mixtures according to the invention exhibit an unusually high reactivity, and thus may make it possible to achieve hardening, that is, formation of a polymeric cross-linked product, at relatively low temperatures, in many cases even at room temperature, e.g. at 20° C.

We have found that the mixtures according to the invention may advantageously be applied to substrates in powder form. Surprisingly, we have noted that in practice such mixtures are especially simple and environmentally safe to handle.

The polycarboxylic acid compounds (I) or (Ia) may be prepared by reacting oligomeric or polymeric compounds containing hydroxyl groups with suitable bisanhydrides such as those having a grouping according to formulae (II) to (VIII), (XI) and (XIII) to (XV). Examples of bisanhydrides, apart from those of formula (III) to (VIII), (XI) and (XIII) to (XV), for this purpose are, for example, pyromellitic acid anhydride, benzophenone tetracarboxylic acid bisanhydride, naphthalene tetracarboxylic acid bisanhydride, tetrahydrofurantetracarboxylic acid bisanhydride, cyclopentane tetracarboxylic acid anhydride, and also the anhydrides containing a group according to any one of formulae (II) and (IIa) obtained, for example, by reacting trimellitic acid anhydride and/or the compound (IX), the bisanhydrides according to formulae (II) to (VIII), (XI) and (XIII) to (XV) and/or other oligomeric bisanhydrides. If carboxylic acid compounds with free COOH and/or ester groups are desired, it is appropriate at least partially to hydrolyse or esterify the bisanhydrides, before or after the coupling thereof to the compounds from which R¹ is derived or, in case (b), before the mixing thereof with the compounds R¹.

In general, the carboxylic acid compounds of formula (I) or (Ia) contain at least two COOH groups and at least one ester group, so that the groups bound to the radical R¹ are present in the form of a partial ester, preferably a hemi-ester, and thus the ester group may be present in place of or together with an anhydride group. Such ester groups may be derived from, for example, monovalent alcohols such as methanol, ethanol, hexanol, octanol, lauryl alcohol or stearyl alcohol (in iso- or n-form). These partial esters may be used either alone or in admixture with other carboxylic acid compounds. They likewise form excellent reaction partners for the epoxy compounds. However, if the components of the mixture according to the invention are to be reacted together in a thin layer and in the presence of atmospheric moisture, the presence of free COOH groups is not absolutely essential. Rather, it is sufficient in many cases if such carboxyl groups are present in the form of anhydride groups. The carboxyl groups in an o-position to the ester group serve as reaction starters in such cases. These groups are bound to component (A) by reaction with the oxirane rings of component (A) and thereby release secondary hydroxyl groups which, in turn, by reaction with the anhydride groups release new carboxyl groups which react with further oxirane rings to cause ring opening. By this process cross-linking takes place, which according to one embodiment of the invention may be carried out under moderate conditions, e.g. at temperatures of 20° to 80° C.

If the mixture according to the invention containing polycarboxylic compounds of type (b) is used, there is generally first prepared a stable mixture of the epoxy component (A) and the component containing OH groups, there being added to this mixture, just before processing, the acid anhydrides of formulae (II) to (VIII) and (XI) to (XV) or reactive derivatives thereof which act as hardeners.

It is also possible that the mixture according to the invention contains, in addition to the carboxylic acid compounds (B), additionally at least one acid anhydride, not bound to a polymer or condensation product, of a polycarboxylic acid having a grouping according to formulae (II) to (VIII),

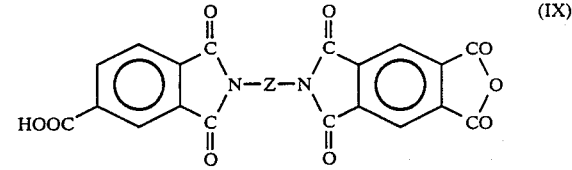

(XI) and (XIII) to (XV) and/or trimellitic acid anhydride. Further free acid anhydrides which may be present, are for example, those of the acids specified for R⁵ and also those of tetrahydrofuran tetracarboxylic acid, benzofuran tetracarboxylic acid and benzofuran hexacarboxylic acid. They are preferably used with halogenated acids together with other non-halogenated acids. These additional anhydrides may also be at least partially esterified or hydrolysed to form free carboxyl groups. In this case, the mixtures according to the invention may also be hardened into films with excellent properties even under moderate reaction conditions, e.g. at room temperature or for mixtures in powder form e.g. also at 80° C. These additional anhydrides may optionally also be present in the form of their partial esters. Ester formation may take place either when incorporated into component (B) or, before the preparation thereof, on the anhydride or on the free COOH groups.

The proportion of oligomeric anhydrides incorporating groups of formula VI relative to the total quantity of acid anhydrides is conveniently 0.1 to 99.8, preferably 30 to 70% by weight.

If the acid anhydrides also contain trimellitic acid anhydride, the proportion thereof relative to the total quantity of acid anhydrides is desirably 0.1 to 30, preferably 5 to 20% by weight.

The expression "polymeric polymerisation and/or condensation products" for R¹ is intended to also include oligomers.

Polyesters forming the radical $R^1$ of component (B) may be prepared in a way known per se from known polycarboxylic acids such as, for example, phthalic acid, isophthalic acid, terephthalic acid, halogen phthalic acids (such as, for example, tetrachlorophthalic or tetrabromophthalic acid), adipic acid, sebacic acid, fumaric acid, maleic acid, endomethylenetetrahydrophthalic acid and hexachloro derivatives thereof, and trimellitic acid, optionally together with monocarboxylic acids such as benzoic acid, butylbenzoic acid, lauric acid, isononanic acid, fatty acids of naturally occurring oils or from mixtures or anhydrides of the said acids where these exist. Suitable alcohol components of these polyesters are, for example, polyhydric alcohols such as ethylene glycol, the propandiols, butandiols, pentandiols (such as neopentyl glycol), hexandiols, diethylene glycol, cyclohexane dimethanol, trimethylpentandiol, trimethylolethane or -propane, glycerol, pentaerythritol, dipentaerythritol, bis-hydroxyethyliso- or -terephthalic acid ester, tris-hydroxyethylisocyanurate, optionally together with monohydric alcohols such as butanol, octanol, lauryl alcohol, linoleyl alcohol, ethoxylated or propoxylated phenols and the like, either alone or in admixture.

The polyesters of component (B) may also be obtained by at least partial chemical decomposition of high-molecular polyesters of an aromatic nature, such as, for example, terephthalic acid-ethylene glycol or -butandiol polyesters, isophthalic acid-ethylene glycol or -hexandiol polyesters, by reaction with monohydric and/or polyhydric alcohols, esters, dicarboxylic acids and the like. If the reaction is carried out with monohydric alcohols, they may be reacted in less than stoichiometric quantities.

Condensation products, including those in the form of polyesters, may also contain at least one of the following groups: ester, amide, imide, ether, thioether, sulphone or amine groups. The hydroxyl groups of the radical $R^1$ may also be phenolic, but are preferably alkanolic. Other compounds containing hydroxyl groups from which the radical $R^1$ may be derived are, for example, polymerisation products in the form of polyvinyl alcohol; copolymers of vinyl acetate with unsaturated monomers such as styrene and/or acrylic acid ester, these copolymers being saponified at least partially e.g. to form vinyl alcohol units; and polymerisation products which are prepared in a known way by homopolymerisation or copolymerisation of hydroxyalkyl acrylates, methacrylates or maleinates with olefinically unsaturated monomers, e.g. styrene, $\alpha$-methylstyrene, vinyltoluene, alkyl acrylates, allyl compounds, cyclopentadiene and derivatives thereof.

Examples of phenolic resins from which the group $R^1$ may be derived are e.g. those with free hydroxymethyl and/or hydroxyethyl groups such as resols. Suitable phenolic components of these resins are monohydric or polyhydric, mononuclear or polynuclear phenols such as phenol itself, the various cresols, xylenols with 2 hydrogen atoms in the ortho- and/or para-position relative to the hydroxyl group, m-xylenol, butylphenols, naphthol, resorcinol, diphenylolmethane, diphenylolpropane, and also alkyl phenols. If reacted with formaldehyde in the preparation of the phenolic resin, it is preferred to use difunctional or trifunctional alkyl phenols, especially o- or p-alkyl-phenols with straight or branched chains or phenols substituted by alicyclic or aralkyl radicals the alkyl groups of which have 1 to 20 carbon atoms, such as, for example, p-isopropyl-, p-tert.-butyl-, p-isooctyl-, p-isononyl-, p-isododecyl-, o-sec-butyl-, o-isononyl-, o-isododecyl-, p-cyclohexyl and 3,5-di-isopropyl- and 3,5-di-isobutylphenol. Any alkyl phenol may also be used with minor amounts of higher alkylated phenols. Preferably, however, the iso-compounds of the above-mentioned radicals and also tert-butyl-phenols are used. Those phenols are, however, preferred which have at least 2 reactive hydrogen atoms e.g. phenol or resorcinol.

Aldehydes which may be used in the preparation of the phenolic resins are, for example, formaldehyde in aqueous solution as paraformaldehyde or in the form of other formaldehyde-releasing substances such as trioxan; acetaldehyde, e.g. in the form of acetaldehyde-releasing substances; and higher aldehydes such as propionaldehyde, butyraldehyde, isobutyraldehyde, and benzaldehyde.

Suitable phenolic resins in the form of resols are, for example, those in which, on condensation, the molar ratio of phenol to formaldehyde is 1:(0.9 to 1.8), preferably 1:(0.95 to 1.4).

Suitable epoxy compounds for incorporation as component (A) with the mixtures according to the invention are, for example, polyepoxyalkanes having from 4 to 20, preferably 4 to 12 carbon atoms, and from 2 to 6, preferably 2 to 4, oxirane rings; epoxidised butadiene oils and C-alkylation products thereof, e.g. isoprene oils; aliphatic polyglycidyl ethers, e.g. glycidyl ethers of polyols, such as ethylene glycol, diethylene and/or triethylene glycol, 2,2-dimethyl-propandiol, propan-1,2- or -1,3-diol, butan-1,4- or 1,3-diol, pentan-1,5-diol, hexan-1,6-diol, glycerol, trimethylolpropane, cyclohexane dimethanol, and glycidyl ethers containing siloxane groups, epoxidised fatty acid esters, e.g. epoxidised soya-bean oil, epoxidised linseed oil or dimeric and/or trimeric compounds of this type; alicyclic bis-epoxides, e.g. vinyl cyclohexane dioxide, limonene dioxide, bis-(epoxy-cyclohexyl)-methane or propane, dicyclopentadiene dioxide, bis-(epoxy-cyclopentyl)ether; epoxidised aliphatic and/or cycloaliphatic allyl ethers and/or allyl esters, e.g. bis(epoxy-propyl)-hexahydrophthalate, bis-(epoxy-propyl)-adipate; and also epoxidised polyesters and/or oligomeric or polymeric glycidyl, acrylic or methacrylic acid esters and/or copolymers thereof, e.g. with acrylic or methacrylic acid esters, maleic acid esters, ethylene, propylene, butylene, styrene, vinyl-toluene, $\alpha$-methyl-styrene, vinyl-cyclohexane; and trimerised epoxy compounds, e.g. triglycidyl isocyanurate, ether individually or in admixture. It is also possible to employ as component (A), epoxides obtained by reacting the polycarboxylic acid compounds of formula (I) or (Ia) with OH or epoxy groups of epoxides to form esters which still contain epoxy groups.

If desired, mixtures of the above-mentioned polyepoxy compounds with monoepoxides may also be used as component (A). Monoepoxides which may be used for this purpose are, for example, olefin oxides (such as octylene oxide), butyl glycidyl ether, allylglycidyl ether, phenylglycidyl ether, p-butyl-phenolglycidyl ether, cresylglycidyl ether, 3-(pentadecyl)-phenylglycidyl ether, styryl oxide, glycidyl methacrylate, cyclohexene vinylmonoxide, dipentene monoxide, $\alpha$-pinene oxide, and glycidyl esters of tert.-carboxylic acids.

Liquid epoxy compounds may also be used as component (A) for the mixtures according to the invention, including those in powder form, although in the latter case it should be noted that such compounds should be used only if a solid mixture is present. Thus, the liquid epoxy compounds for component (A) will preferably be used in minor amounts, e.g. in a proportion of 10 to 40% by weight relative to the total quantity of component (A). On the other hand, it is also possible to use a wholly or only partially liquid component (A) mixed with component (B) and the mixture subsequently subjected to a preliminary reaction e.g. in an extruder, so that the extrudate is solid, but not completely hardened.

In addition it will be appreciated that component (B) may itself be a liquid, thus at least one of components (A) and (B) is preferably a liquid.

Hardening of the mixtures according to the invention generally takes place at temperatures of from 0° to 350° C. Of the above-mentioned epoxy compounds, aliphatic and cycloaliphatic epoxy compounds especially react very readily with the carboxylic acid compounds to cause cross-linking and polymer formation. In many cases, excellent cross-linking may be obtained even at room temperature, e.g. at 20° C., even without a catalyst. However, the hardening time is significantly reduced by elevating the temperature, for example, to 30 to 210, preferable 80° to 190° C. In using powdered compositions for the preparation of suitable products the hardening may generally be performed at 80 to 310, preferable 100 to 280, and advantageously 140° to 220° C.

The mixtures according to the invention allow the possibility of hardening solvent-free systems, namely, powder coatings with or without catalysts, at such low stoving temperatures, e.g. in the range of from 100 to 180, preferably 130° to 160° C., for conventional stoving times, e.g. up to 30 minutes, that even a large number of heat-sensitive organic pigments may be used in the mixtures without any significant damage. When used as thermoplastic adhesives the hardening temperature may be even lower, e.g. 70° to 80° C.

As a result of the high reactivity of the hardeners excellent coatings may be obtained even under the so-called shock-drying conditions, as applied, for example, in coil or can coating processes, that is, at temperatures of 200° to 350° C. and with extremely short times, e.g. 10 seconds to 3 minutes.

We have further found that the mixtures according to the invention also have a good so-called "overburning resistance", that is, upon local overheating during stoving to a higher temperature than normal stoving temperatures they have good resistance and do not show any signs of decomposition or embrittlement. Even when the required stoving time is considerably prolonged no diminution of the good film properties occurs.

We have also surprisingly found that the mixtures according to the invention, especially it they are in powder form, are shelf-stable for several months without a noteworthy pre-reaction at room temperature or at slightly elevated temperatures, e.g. up to approximately 50° C., despite their high reactivity, and even when they contain catalysts.

Conveniently, the ratio of free carboxyl groups of the polycarboxylic acid compounds (B) of the mixtures according to the invention to the epoxy group equivalent in the epoxy compounds (A) is 1:5 to 5:1, preferably 1:1.5 to 1:0.5. Within the preferred range, e.g. in a ratio of 1:1, especially good film-forming properties may be obtained. An excess of COOH groups may bring about an improvement of adhesion. An excess of epoxy groups may be used e.g. in the case of strongly lipophilic systems, e.g. for primers. The ratio will therefore be adjusted according to the intended use.

From another viewpoint, the ratio of anhydride groups of the polycarboxylic acid compounds (B) to the OH groups of the epoxy compounds (A) may conveniently be 20:1 to 1:20, preferably 5:1 to 1:5.

In an embodiment of the invention, especially with powder mixtures, the COOH groups of component (B) are present in a proportion of 0.1 to 20, preferably 2 to 10% relative to the COOH group equivalent, in the form of a salt with a metal or a quaternary ammonium. The presence of such salt groups is of especial interest when it is desired to form coatings having a matt finish or with other surface effects.

Salt-forming compounds which may be used for this purpose are, for example, compounds of sodium, potassium, lithium, calcium, magnesium, zinc and aluminium, e.g. their oxides, hydroxides, carbonates and salts of organic carboxylic acids, such as acetates or the like; tertiary amines such as trimethylamine, triethylamine, tributylamine; and heterocyclic compounds containing nitrogen, such as pyrazoles, piperidine, imidazoles, imidazoline or the like. Salt formation may take place e.g. by addition of the salt-forming substance to the mixture before any homogenisation.

In a further embodiment of the invention the mixture additionally contains at least one thermosetting synthetic resin containing hydroxyl groups, e.g. a phenolic resin and/or amine resin in a proportion of up to 30, preferably 2 to 15% by weight of the total solids content. Especially when it is desired to harden at elevated temperature, a considerable increase in resistance to chemicals and solvents may be achieved by such an addition. The above-mentioned phenolic resins may be considered for this purpose.

Amine resins which may be incorporated include, for example, urea and/or melamine resins having free OH groups which are optionally partially etherified with monohydric alcohols having 1 to 4 carbon atoms. The molar ratio of melamine to formaldehyde on condensation is generally 1:2 to 4.5 Pentamethylol and hexamethylol melamine are preferred as melamine compounds.

Other resins containing additional OH groups which may be considered are polymers, for example, polyesters with free OH groups and/or homopolymers or copolymers with free OH groups, especially for use in powder mixtures. Examples of such compounds are those described and defined in detail above as compounds from which the radical $R^1$ is derived. The use of these additional resins may afford the advantage that the flow properties and optionally also, if desired, the plasticity of the mixtures are improved and the gloss of coatings prepared therefrom is enhanced.

By the addition of catalysts the reactivity of the polycarboxylic acid hardeners may in many cases be further considerably increased. This has an especially favourable effect on the stoving time required, and also on the stoving temperature. Thus, for example, a powder mixture containing a catalyst may be hardened within 40 seconds at a substrate temperature of 200° C., similar film properties being obtained compared with conventional system hardened for 3 minutes. With a stoving time of 30 minutes the stoving temperature may be lowered from 140° to 120° C. in the presence of a catalyst. In general, the proportion of catalyst is up to 5, preferably from 0.01 to 0.5% by weight, relative to the total solids content.

Catalysts which may be used are, for example, basic catalysts of an inorganic or organic nature, such as hydroxides, carbonates and salts of alkali metals, e.g. lithium hydroxide, potassium carbonate; lithium, sodium or potassium salts of organic and inorganic acids, such as acetic, propionic, lauric, benzoic, salicylic, boric, tungstic molybdic and, diphenylboric acid, and also addition compounds thereof with crown ethers or similar ligands; alkali metal salts of the polycarboxylic acid compounds of formula (I) and/or (Ia); organic or inorganic zinc compounds such as, for example, zinc acetate and phosphorotungstate; cadmium, calcium and tin compounds such as cadmium oxide, dibutyloxotin, trimethyl tin acetate; and/or organic bases such as amines with alkyl, cycloalkyl, hydroxyalkyl and aralkyl groups, such as trialkylamines, e.g. triethylamine, tributylamine, tricyclohexylamine and tribenzylamine; tert.-basic acid amides, e.g. N,N'-bis-(diethylaminomethyl-)oxamide and N-dibutylamino-ethyl acetamide; cyclic bases such as diazobicyclooctane, diazobicyclonones or diazobicycloundecene; imidazole derivatives such as 3-methyl-, -phenyl- or -cyclohexyl-imidazole, imidazolines; N-alkylpiperidines; N,N-dialkyl-piperazines; N-alkyloxazolidine; organic or inorganic phosphorus compounds, e.g. triphenyl phosphite and phosphoric acids; sulphonic acids such as, for example, p-toluenesulphonic acid and 1,5-naphthalenedisulphonic acid; or trialkyl or triaryl phosphines, such as triphenylphosphine; N,N'-tetraalkylaminoalkyl oxamides; and alkyl-N-dialkylaminoalkyl oxamate; all either alone or in admixture. Chelates of magnesium, aluminium and titanium, such as are described e.g. in German Offenlegungschrift No. P 27 23 492.0 as carboxyl group acceptors may also be used as catalysts.

In addition, the hardening reactions are also catalysed by salts of the above-mentioned organic bases with organic acids, e.g. with acetic acid, propionic acid, lauric acid or salicylic acid. As indicated above, catalyst mixtures may also be employed.

The mixtures according to the invention may be used for the preparation of coating compositions in the form of solutions in suitable solvents and also as powder compositions. It is possible, by a suitable choice of polymers containing hydroxyl groups for the addition reaction with the bis-anhydrides, especially those of formula (II) to (IX) and (XIX), to produce substantially liquid compounds of formula (I), and thus produce mixtures which may be processed with liquid epoxy compounds (A) without the addition of a solvent or with the addition of very small quantities of solvent.

Solvents which may be used for the preparation of coating compositions include, for example, toluene, xylene, butanol, ethyl acetate, butyl acetate, ethylene glycol diacetate, ethylene glycol monoethyl or -butyl ether or acetates thereof, ethylene glycol dimethyl ether, diethylene glycol dimethyl ether, petrols containing aromatic compounds, cyclohexanone, methylethyl ketone, acetone, isophorone, butyl acetoxyglycolate and ethyl acetoxyglycolate, either alone or in admixture. In many cases it is also possible to mix these solvents with up to 50% of a white spirit which is low in or free of aromatic compounds.

Powder mixtures according to the invention for use in the preparation of coating compositions generally have a softening point of 40 to 200, preferably 55° to 125° C. (by the method according to Durrans) and a glass transition temperature of 22 to 100, preferably 30° to 70° C.

The mixtures according to the invention have a wide variety of uses due to their high reactivity, stability in storage and solubility. They may be employed wherever stoving temperatures in excess of 100° C. are applied, e.g. as paints, such as priming or covering paints, single-layer paints, and shock-drying systems for coil coating in the coating of cans for preserved food. The invention enables such mixtures to be used in systems in conjunction with liquid reactive diluting agents, such as liquid epoxy resins, polyvalent alcohols and/or hydroxysilicones, provided that when desired the solid nature of the final mixture is guaranteed.

The mixtures according to the invention have an excellent stability towards ultra-violet radiation, and therefore coating systems, e.g. paints, may be prepared which are non-pigmented or pigmented. When used in coating compositions, the mixtures may additionally contain fillers and other conventional additives. The coating compositions harden rapidly and provide coatings which have excellent mechanical properties. Additives (apart from dyestuffs and pigments) which may be present include softeners, stabilisers, wetting agents, dispersing agents, lubricants, diluants, and catalysts in conventional quantities. These substances may be added to the individual components and/or to the total mixture. The dispersing agents are, however, appropriately admixed before homogenisation.

The incorporation of dyestuffs and pigments in the mixtures comes under especial consideration e.g. when the coating compositions according to the invention are to be employed as powder paints, e.g. as corrosion-preventing primers, undercoats or finishing coats. The ratio of solids in the binding agent to the total quantity of pigment is then advantageously in the range from 1:0.1 to 1:10, and preferably 1:0.5 to 1:5.

Dyestuffs or pigments which may be used include, for example, titanium dioxide, graphite, soot, zinc chromate, strontium chromate, barium chromate, lead chromate, lead cyanamide, lead silicochromate, calcium molybdate, manganese phosphate, zinc oxide, cadmium sulphide, chromium oxide, zinc sulphide, nickel titanium yellow, chromium titanium yellow, iron oxide red, iron oxide black, ultramarine blue, phthalocyanine complexes, naphthol red and the like. It is surprisingly of no importance whether the colouring pigments are of an inorganic or organic nature. Also, metallic pigments or those with a metallic appearance, such as aluminium, aluminium bronzes of various hues, copper, tungstate bronzes, antimony and arsenic sulphide bronzes are suitable for consideration for the so-called "metallic paints".

Fillers which may be used include, for example, talc, mica, kaolin, chalk, quartz powder, asbestos powder, ground shale, barium sulphate, silicates, glass fibres, organic fibres and the like; suitable anti-setting agents are, for example, finely distributed silicic acid, bentonite, colloidal silicates and the like.

Suitable flowing-agents include, for example, ketone resins, telomers containing anhydride groups, such as styrene-maleic acid-anhydride telomers, oligomeric acrylic or methacrylic acid esters.

The coating compositions according to the invention may be applied to diverse substrates, provided that these are able to withstand the hardening temperatures for the coating. Such substrates include, for example, ceramics, wood, glass, concrete, plastics, and preferably metals such as iron, zinc, titanium, copper, aluminium, steel, brass, bronze, magnesium and the like. The substrates may optionally be made more liable to adhesion or more resistant to corrosion by suitable mechanical and/or chemical pretreatment. However, the coatings according to the invention generally adhere excellently to diverse metal substrates without any adhesion-assisting primer or undercoating layer. The good adhesion of the coatings corresponds to the values GT OA to GT 1A in the test regulations according to DIN Standard 53 151. In addition, the coverings may be shaped very easily, have a high weather resistance and show excellent chemical stability.

The coating compositions according to the invention are suitable for the preparation of corrosion-resisting coatings and/or undercoats for various applications, especially as resistant paints and matt varnishes. They may also be suitable for the coating and lining of objects which come into contact with corrosive media, such as aerosol propellants and solvents; protective coatings against atmospheric influences, such as road markings; coating of household appliances, machines, vehicle parts, components for electrotechnical purposes or elements thereof, and especially for electrical conductors; and for the coating of thermally stressed objects.

Due to their favourable properties the coating compositions according to the invention are also suitable for single-layer varnishes. Depending on the choice of component (A), sheets coated with the coating compositions according to the invention may subsequently be shaped by deep-drawing, folding, profiling, stamping or the like without a significant impairment of the remaining favourable properties. The coating layer may be left unchanged, but it may also serve as an undercoating layer, that is, as a substrate for further coatings which may, as desired, consist of a composition according to the invention or another conventional coating material. The coatings obtained may be, for example, glossy films with excellent mechanical and chemical stability and good weather resistance. On the other hand, it is also possible to prepare, as desired, matt paints with outstanding mechanical and chemical properties. Surprisingly, a high proportion of pigment and/or filler is not required for this purpose.

When the powder mixture according to the invention is applied to a substrate layer formed from another coating material, it is possible, for example, that the substrate coating is based on a non-hardenable binding agent, e.g. a thermoplastic binder, such as vinyl monomers, e.g. vinyl butyrate and the like; and cellulosic coatings such as those based on cellulose acetate, cellulose acetobutyrate or the like. The powder mixture according to the invention is generally not applied until after the physical drying of the basic coatings. By a suitable choice of the undercoat, special effect coatings e.g. for colouring, such as iridescent paints or those with specially profiled surfaces, may be obtained.

The mixtures according to the invention in solid form are also suitable for 2-component adhesives, e.g. as highly reactive melting adhesives, and also for the preparation of laminates. When powder mixtures are used, evaporation of solvent does not arise, which is of especial advantage when applied to large areas. The mixtures according to the invention are also suitable for liquid and/or solvent-containing, thermosetting adhesives. In addition, they may be employed as binding agents for textile, organic and/or inorganic materials. Powder mixtures may be used e.g. for fibrous materials of asbestos, glass, slag wool and sufficiently thermostable organic fibres. In this case, the absence of solvent results in an environmentally safe system of noticeable advantage. The powder mixtures according to the invention may be measured out easily and may be applied e.g. by sprinkling. The mixtures according to the invention may also be suitable for use as hardenable moulding compounds, casting resins, cements, cellular or porous materials such as foam bodies and as insulating coatings.

The following Examples serve to illustrate the invention, and in these Examples, T represents parts by weight and % represents percent by weight, unless specified otherwise. The composition of the anhydrides or of the acids obtained by hydrolysis of the anhydrides was determined by gel permeation chromatography.

The preparation of acid components (B) by hydrolysis is set out in the following Tables 1 and 2. Examples of the reactive mixtures can be seen in Table 3.

Preparation of the polycarboxylic acids or acid compounds:

A—Compound with free COOH groups [of formula (Ia)]

An anhydride mixture with an acid number ($H_2O$/-dimethylformamide, "DMF") of 608 or (butanol) of 298, prepared by reacting trimellitic acid anhydride with propane-1,2-diol and consisting of trimellitic acid anhydride and anhydrides of formula XIV and XV in the ratio given in Table 1, is dissolved in 150 T of ethylglycol acetate (that is, ethylene glycol-monoacetic acid ester-monoethyl ether). After heating to 60° C., 289 T of a 70% solution of a polyester containing hydroxyl groups based on phthalic acid anhydride, isononanic acid, trimethylol propane and dimethyl propandiol in ethylglycol acetate with an OH number of 100 (relative to solid resin), are admixed after adding 0.3 T of catalyst.

The temperature is then increased to 100° C. After a reaction time of 1 hour, 12 T of water are admixed and hydrolysis is completed in 4 hours at this temperature. The acid number of the reaction mixture before and after hydrolysis can be seen from Table 1. This shows that addition and hydrolysis are practically completed.

The polycarboxylic acid compound (B) thus prepared is in the form of a moderately viscous, clear, yellow solution which is suitable without further treatment for hardening with the above-described epoxy compounds (solids content: 60%).

B—Polyanhydride (Formula (I))

300 T of a 50% solution of the anhydride mixture described in A (above) in a mixture of ethylglycol acetate and methylethyl ketone (volume ratio 1:1) are heated to 70° C. and 211 T of a 60% solution of a hydroxyacrylic polymer based on hydroxyethyl acrylate, hydroxypropyl acrylate, methylmethacrylate, butyl methacrylate and styrene with an OH number of 160 (relative to 100% polymer) are added. After stirring for 5 hours at 70° C. the addition is complete. The final acid number (dimethylformamide/$H_2O$) corresponds to 76.3% (theoretical 75%) and that in butanol corresponds to 52% of the starting acid number (theoretical 50%). The reaction product thus obtained is a light yellow, low-viscosity polyanhydride solution. It is suitable in this form as an anhydride hardener.

C—Monomeric polycarboxylic acid not bound to $R^1$

300 T of a 50% solution of the anhydride mixture described in A (above) in a mixture of ethylglycol acetate and butyl acetate (7:3) are heated to 85° C. with the addition of 1 T of N-methyl-piperidine and 0.5 ml of acetic acid. Water is then added over 1 hour. The reaction mixture is stirred for 3 hours at 85° to 90° C. to complete hydrolysis. A clear, yellow, low-viscosity hardener solution is thus obtained.

D to F

The carboxylic acid compounds D and F are prepared analogously to A to C (above) respectively. The bisanhydride component used is a mixture prepared from trimellitic acid anhydride, propane-1,2-diol, trimethylol propane and glycerol in a molar ratio of 4:2.15:0.05:0.2. The acid numbers of this mixture are 508 in water and 245 in butanol.

The polyester containing OH groups is prepared based on phthalic acid anhydride, isophthalic acid, maleic acid anhydride, propandiol and glycerol.

G

An anhydride mixture with acid number ($H_2O$) 506 and acid number (n-butanol) 287; the hydroxyacrylate resin as described in B (OH number 160), 60% in ethylglycol acetate; and 9.5 T of diazobicyclooctane are combined.

The starting mixture is reacted at 75° C. until the initial acid number shown in Table 1 is reached. After the addition of 12 T of water, hydrolysis is carried out at 100° C. until the final acid number shown is obtained. A clear, light yellow, moderately viscous polycarboylic acid solution with approximately 77% solids is obtained.

H (Formula (Ia)) anhydride mixture ($R^4$=—$CH_2$—$CH_2$—): acid number ($H_2O$/dimethylformamide) 523, acid number (n-butanol) 266. Addition: 4 hours at 90° to 100° C., and hydroylsis: 8 hours at approximately 100° C.

I (Formula (I)) anhydride mixture ($R^4$=—$CH_2$—$CH_2$—O—$CH_2$—$CH_2$—): acid number ($H_2O$/dimethylformamide) 436, acid number (n-butanol) 253. OH-Polyacrylate: OH number 74, 40% in methylethyl ketone/xylene (volume ratio 1:4). Addition: 2 hours at 80° C., 2 hours at 100° C., and 4 hours at 110° C.

J (Formula (Ia)) anhydride mixture

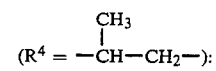
($R^4$ = —CH—$CH_2$—):

acid number ($H_2O$/dimethylformamide) 512, acid number (n-butanol) 283. OH-Polyester: OH number 105, 55% in ethylglycol acetate. Addition: 2 hours at 65° C., 4 hours at 120° C., and hydrolysis: 8 hours at 100° to 110° C.

K (Formula (I)) anhydride mixture

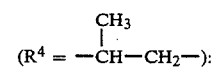
($R^4$ = —CH—$CH_2$—):

acid number ($H_2O$/dimethylformamide) 512, acid number (n-butanol) 283. OH-Polyacrylate (copolymer): OH number 48, 50% in xylene/ethylglycol acetate (3:7). Addition: 12 hours at 50° C., and 1 hour at 90° C.

TABLE 1

|  | A | B | C | D | E | F |
|---|---|---|---|---|---|---|
| Anhydride mixture |  |  |  |  |  |  |
| TMSA* % | 12.2 | 12.2 | 12.2 | 5.5 | 5.5 | 5.5 |
| Bis-Anhydride % | 41.2 | 41.2 | 41.2 | 40.3 | 40.3 | 40.3 |
| Oligomeric bis-Anhydride % | 46.6 | 46.6 | 46.6 | 54.2 | 54.2 | 54.2 |
| Anhydride mixture proportion T | 150 | 300 | 300 | 150 | 150 | 150 |
| Solvent | EGA(+) | EGA + MEK' | EGA + Butyl acetate (7:3) | EGA | EGA | MEK |
| proportion T | 150 | 300 | 300 | 150 | 150 | 150 |
| $R^1$ | Polyester | OH—copolymer | — | Polyester | OH—Polyacrylate | — |
| proportion T | 289 | 211 | — | 272 | 198 | — |
| % content | 70 | 60 | — | 70 | 60 | — |
| $H_2O$ T | — | — | 11 | 12 | — | 10 |
| Catalyst | Diazobicyclooctane | — | (a)N—Methyl-piperdine + (b)acetic acid | Triethylamine | Li-Benzoate | Diazobicyclooctane |
| proportion T | 0.3 | — | (a)1 + (b)0.5 ml | 0.5 | 0.5 | 0.5 |
| Starting acid number |  |  |  |  |  |  |
| DMF/$H_2O$ | 245 | 258 | — | 216 | 281 | 470 |
| n-Butanol | 130 | — | 291 | 110 | 143 | 241 |
| Final acid number |  |  |  |  |  |  |
| DMF/$H_2O$ | 217 | 197 | — | 166 | 211 | 476 |

TABLE 1-continued

| | | | | | | |
|---|---|---|---|---|---|---|
| n-Butanol | 210 | 134 | 560 | 161 | 144 | 468 |
| Solids % | 60 | 65 | 50.5 | ~60 | ~54 | ~51 |

| No. | G | H | I | J | K |
|---|---|---|---|---|---|
| Anhydride mixture | | | | | |
| TMSA* | 11.4 | 1.6 | 6.5 | 10 | 10 |
| Bis-Anhydride % | 56.1 | 94.6 | 48.0 | 69.3 | 69.3 |
| oligomeric bis-Anhydride % | 32.5 | 4.1 | 45.5 | 20.7 | 20.7 |
| Anhydride mixture porportion T | 150 | 200 | 200 | 200 | 200 |
| Solvent | EGA | EGA + Xylene + MEK (7:2:1) | MEK/Xylene (1:4) | EGA/Xylene (8:2) | EGA/Butyl acetate (6:4) |
| proportion T | 150 | 200 | 200 | 200 | 200 |
| R¹ | OH—polyacrylate | Polyester | OH—Polyacrylate | Polyester | OH—Polyacrylate |
| proportion T | 198 | 192 | 736 | 443 | 1067 |
| % content | 60 | 65 | 40 | 55 | 50 |
| H₂O T | — | 14 | — | 15 | — |
| Catalyst | Diazobicyclooctane | Al—Trisacetonylacetonate | — | N—Methylmorpholine + N—Methylpiperidine | Tributylamine |
| proportion T | 9.5 | 0.7 | — | 0.5 + 0.5 | 0.5 + 0.34 |
| Starting acid number | | | | | |
| DMF/H₂O | 212(H₂O) | 244(H₂O) | 436 | 176(H₂O) | — |
| n-Butanol | 146 | 163 | 253 | 119 | |
| Final acid number | | | 133.5 | | 105(H₂O) |
| DMF/H₂O | 205(H₂O) | 233(H₂O) | (H₂O) | 168(H₂O) | 66.5 |
| n-Butanol | 200 | 227.5 | 90 | 162 | |
| Solids % | ~77 | 56 | — | — | — |

*° = TMSA = trimellitic acid anhydride*
*+ = EGA = ethylglycol acetate*
*' = MEK = methylethyl ketone*
*⊕ = glacial acetic acid*

TABLE 2

| No | L | M | N |
|---|---|---|---|
| Quantity used | 200 g PMDA² 890 g OH—Polyester solution¹ 0.5 g Tributylamine | 200 g BPDA³ 603 g OH—Polyester solution¹ 14 g Water 0.5 g N—Methylpiperidine 0.3 g acetic acid | 200 g TFDA⁴ 990 g OH—Polyester solution¹ 14 g Water 0.5 g Li-benzoate |
| Addition h/°C. | 11ʰ/100° C. | 7ʰ/115° C. | 5ʰ/100° C. |
| Hydrolysis h/°C. | — | 12ʰ/100° C. | 6ʰ/100° C. |
| Acid number (H₂O) before Hydrolysis | 230.0 | 198.5 | 268.0 |
| acid number | 154.0 | 134.0 | 181.0 |
| (n-Butanol) before Hydrolysis acid number (H₂O) after Hydrolysis | — | 193.0 | 263.0 |
| acid number after Hydrolysis | — | 187.5 | 259.5 |
| Solids % | ~63 | ~67 | ~60 |

¹OH—Polyester solution from Example 7 (OH-number 105) 55% in ethyl glycol acetate
²PMDA = pyromellitic acid dianhydride
³BPDA = benzophenone tetracarboxylic acid dianhydride
⁴TFDA = tetrahydrofuran tetracarboxylic acid dianhydride

TABLE 3

| Example | 1 | 2 | 3 | 4 | 5 |
|---|---|---|---|---|---|
| Anhydride or acid compound (B) | G Sz(+)(H₂O) = 203 182.0 g 55% | I Sz(H₂O) = 133 250 g 40% Sz(But) = 90 | F Sz(H₂O) = 468 196.0 g 51% | H Sz(H₂O) = 233 222.0 g 45% | J Sz(H₂O) = 168 200.0 g 50% |
| Epoxy Compound (A) | epoxidised linseed oil EP(++):9.0 85.0 g | epoxidised soya-bean oil EP:6.8 56.0 g | epoxidised polybutadiene oil EP:6.0 100.0 g | epoxidised linseed and soya-bean oil 2:1 EP:8.3 80.3 g | dicyclopentadiene dioxide EP 19.0 25.0 g |
| Catalyst % (relative to | — | 0.2 Diazabicyclooctane | Phenylimidazole | — | 0.05 N—Methyl-piperidine |

TABLE 3-continued

| solid resins) Solvent for dilution | ethyl glycol acetate/Xylene (1:1) | — | — | Butyl acetate/Xylene (2:1) | Xylene |
|---|---|---|---|---|---|
| Example | 6 | 7 | 8 | 9 | 10 |
| Anhydride or acid component (B) | K Sz(H₂O) = 105 Sz(But) = 66.5 200.0 g 50% | L Sz(H₂O) = 230 Sz(But) = 154 208.3 g 48% | M Sz(H₂O) = 193 250.0 g 40% | M Sz(H₂O) = 193 250.0 g 40% | M Sz(H₂O) = 193 250.0 g 40% |
| Epoxy compound (A) | bis-glycidyl-adipate EP:12.1 24.0 g | epoxidised linseed oil EP:8.6 | epoxidised soya-bean oil EP:6.6 83.0 g | epoxidised soya-bean oil EP:6.6 108.0 g (30% excess) | epoxidised soya-bean oil EP:6.6 58.0 g (30% shortage) |
| Catalyst % (relative to solid resin) | 0.3 butyl-N—dibutyl-oxamate | N—Methyl-morpholine | N,N'—Tetra-butyl oxamide 0.2 | N,N'—Tetra-butyl oxamide 0.2 | N,N'—Tetra-butyl oxamide 0.2 |
| Solvent for dilution | — | Methyl ethyl ketone | Methyl ethyl ketone/Xylene (3:1) | Methyl ethyl ketone/Xylene (3:1) | Methyl ethyl ketone/Xylene (3:1) |

| Example | 11 | 12 | 13 | 14 |
|---|---|---|---|---|
| Anhydride or acid component (B) | N Sz(H₂O) = 263 200.0 g 50% | I Sz(H₂O) = 133 250.0 g 40% | M Sz(H₂O) = 193 149.0 g 67% | OH acrylic resin 60% in ethyl glycol acetate OH-number: 160, 167.0 g Bis-anhydride component D Sz(H₂O) = 508 Sz(Butyl) = 245 50% in ethyl glycol acetate 122.0 g |
| Compounds R¹ | Vinyl cyclohexene dioxide EP:20.1 33.0 g | epoxidised soya-bean oil EP:6.8 56.0 g and 32.0 g Melamine resin methyl-etherified, 50% in Xylene/Ketone (2:1) mixture | epoxidised soy-bean oil EP:6.6 58.0 g (30% shortage 20.0 g Isodecyl-N, N—Tetrabutyl-glycidyl ester EP:6.6 | epoxidised linseed oil EP:9.0 52.0 g |
| Catalyst % content (relative to solid resin) | Li-stearate 0.1 | — | N,N'—Tetra-butyl oxamide 0.2 | (a) 2-Phenyl-2-imidazoline + (b) Methyl ethyl ketone (c) 2 + b) 8.5 |
| Solvent for dilution | Methyl ethyl ketone | — | — | — |

(+) Sz = acid number
(++) EP = epoxy number

Mixtures in powder form

The preparation of acid component (B) for the powder mixtures 15 to 20 is given in the following Table 5. The acid numbers specified therein each relate to 100% solid resin.

Preparation of polycarboxylic acid units (B)

(a) 100 T of anhydride mixture D to F are melted at 80° C. 79.4 T of a pulverised polyester of phthalic acid anhydride, isophthalic acid anhydride, dimethyl propandiol, hexan-1,6-diol and trimethylol propane (OH number 160) are added over 1 hour. 6.6 T of water are then added over 20 minutes. The clear reaction mixture is kept at 80° to 85° C. for a further 4 hours with stirring. After cooling, a clear, brittle, easily pulverisable, light yellow resin is obtained with an acid number (DMF/H₂O) of 209, (n-butanol) 203.

(b) The procedure is as under (a), but a hydroxyalkyl acrylic polymer based on hydroxyethyl acrylate, hydroxypropyl acrylate, methyl methacrylate, butyl methacrylate and styrene with an OH number of 100 (relative to 100% polymer) in a proportion of 127 T to 100 T of anhydride mixture is now used instead of the polyester. The quantity of water added is 6.1 T. A clear, easily pulverisable, slightly yellow resin is obtained with an acid number (DMF/H₂O) of 170, (n-butanol) 166.

Preparation of the mixtures in powder form

For painting tests the powdery mixtures 15 to 20 according to the invention are mixed with commercial titanium dioxide pigment in a ratio of 1:1, extruded, ground and screened. The powder paints obtained are sprayed electrostatically onto phosphated sheets and stoved under the hardening conditions mentioned in the following Table 7.

EXAMPLES

The following Tables 4, 6 and 7 give a summary of the mixtures according to the invention of the carboxylic acid units (B) or the polycarboxylic acid anhydrides and the epoxy component (A) and optionally further resin components as well as of the hardening conditions of the individual mixtures and the test results arrived at on the hardened products. In the grading of a scratch resistance 0 is the best value and 5 the worst value.

Tables 6 and 7 refer only to the mixtures in powder form. The anhydride component B is designated therein by (a) and (b).

Discussion of the results

As shown by Tables 4, 6 and 7, all the Examples give excellent coating properties and a high resistance to chemicals, irrespective of the composition of the individual hardeners or the structure of the epoxy component (A).

TABLE 4

Example 1

| Measurement in days | Hardening conditions | | | | | |
|---|---|---|---|---|---|---|
| | room temperature | 80° C. 30 min | 140° C. 30 min | (+) | pot time hrs. | (+) (min.) |
| | 1 / 7 | 1 / 7 | 1 / 7 | | | |
| Pendulum hardness according to Konig (s) | 94 / 171 | 150 / 176 | 205 / — | | 100 | 80 |
| Xylene resistance (min) | <1 / >120 | 45 / >120 | >120 / — | | | |
| Scratch resistance | 5 / 1 | 3 / 0 | 0 / — | | | |
| Erichsen depression (mm) | 9.5 / 10.2 | 8.8 / — | 8.5 / — | | | |
| Gloss according to Lange (60° C.) | 95 / 90 | 89 / 86 | 85 / — | | | |

Example 2

| Measurement in days | Hardening conditions | | | | | |
|---|---|---|---|---|---|---|
| | room temperature | 80° C. 30 min | 140° C. 30 min | (+) | pot time hrs. | (+) (min.) |
| | 1 / 7 | 1 / 7 | 1 / 7 | | | |
| Pendulum hardness according to Konig (s) | 102 / 150 | 130 / 155 | 170 / — | | 48 | 50 |
| Xylene resistance (min) | <1 / 30 | 20 / 40 | 45 / — | | | |
| Scratch resistance | 5 / 2-3 | 3.5 / 2 | 1 / — | | | |
| Erichsen depression (mm) | 8.1 / 8.2 | 9.0 / 8.8 | 7.8 / — | | | |
| Gloss according to Lange (60° C.) | 96 / 93 | 91 / 89 | 92 / — | | | |

Example 3

| Measurement in days | Hardening conditions | | | | | |
|---|---|---|---|---|---|---|
| | room temperature | 80° C. 30 min | 140° C. 30 min | (+) | pot time hrs. | (+) (min.) |
| | 1 / 7 | 1 / 7 | 1 / 7 | | | |
| Pendulum hardness according to Konig (s) | 94 / 176 | 175 / — | 207 / 230 | | 24 | 360 |
| Xylene resistance (min) | 5 / >120 | 60 / >120 | >120 / >120 | | | |
| Scratch resistance | 5 / 0 | 1 / 0 | 0 / 0 | | | |
| Erichsen depression (mm) | 7.5 / 6.8 | 8.2 / 8.5 | 6.8 / — | | | |
| Gloss according to Lange (60° C.) | 97 / 96 | 93 / 95 | 89 / — | | | |

Example 4

| Measurement in days | Hardening conditions | | | | | |
|---|---|---|---|---|---|---|
| | room temperature | 80° C. 30 min | 140° C. 30 min | (+) | pot time hrs. | (+) (min.) |
| | 1 / 7 | 1 / 7 | 1 / 7 | | | |
| Pendulum hardness according to Konig (s) | 114 / 196 | 195 / 227 | 240 / — | | 12 | 45 |
| Xylene resistance (min) | 10 / >120 | 80 / >120 | >120 / — | | | |
| Scratch resistance | 4 / 0 | 0 / 0 | 0 / — | | | |
| Erichsen depression (mm) | 7.7 / 7.9 | 8.0 / 8.3 | 6.9 / — | | | |
| Gloss according to Lange (60° C.) | 89 / 87 | 91 / 93 | 86 / — | | | |

Example 5

| Measurement in days | Hardening conditions | | | | | |
|---|---|---|---|---|---|---|
| | room temperature | 80° C. 30 min | 140° C. 30 min | (+) | pot time hrs. | (+) (min.) |
| | 1 / 7 | 1 / 7 | 1 / 7 | | | |
| Pendulum hardness according to Konig (s) | 70 / 130 | 110 / 140 | 155 / — | | 40 | 35 |
| Xylene resistance (min) | <1 / 22 | 28 / 28 | 30 / — | | | |
| Scratch resistance | 5 / 2 | 3 / 2 | 2 / — | | | |
| Erichsen depression (mm) | 9.5 / 8.4 | 8.8 / 9.1 | 7.5 / — | | | |
| Gloss according to Lange (60° C.) | 93 / 91 | 89 / 92 | 93 / — | | | |

Example 6

| Measurement in days | Hardening conditions | | | | | |
|---|---|---|---|---|---|---|
| | room temperature | 80° C. 30 min | 140° C. 30 min | (+) | pot time hrs. | (+) (min.) |
| | 1 / 7 | 1 / 7 | 1 / 7 | | | |
| Pendulum hardness according to Konig (s) | 30 / 70 | 60 / 85 | 90 / — | | 98 | 140 |
| Xylene resistance (min) | <1 / <1 | <1 / <1 | 2 / — | | | |
| Scratch resistance | 5 / 4 | 4 / 4 | 3 / — | | | |
| Erichsen depression (mm) | 10.5 / 10.7 | 10.2 / 10.4 | 9.8 / — | | | |
| Gloss according to Lange (60° C.) | 98 / 102 | 96 / 96 | 95 / — | | | |

Example 7

| Measurement in days | Hardening conditions |
|---|---|
| | 1 / 7 |

Example 8

| Measurement in days | Hardening conditions |
|---|---|
| | 1 / 7 |

Example 9

| Measurement in days | Hardening conditions |
|---|---|
| | 1 / 7 |

TABLE 4-continued

|  | Hardening conditions | | | | | | | | | | | | |
|---|---|---|---|---|---|---|---|---|---|---|---|---|---|
|  | room temperature | | | | 80° C. 30 min | | | | 140° C. 30 min | | | | pot time hrs. (+) (min.) |
| Pendulum hardness according to Konig (s) | 75 | 145 | 150 | — | 186 | 195 | — | — | 120 | 160 | 176 | 48 | 120 |
| Xylene resistance (min) | <1 | >120 | 35 | — | >120 | >120 | — | 58 | 45 | 50 | 70 | — | — |
| Scratch resistance | 5 | 2 | 2 | — | 2 | 1 | — | 5 | 2 | 2 | 1 | — | — |
| Erichsen depression (mm) | 7.5 | 7.9 | 7.3 | — | 8.1 | 6.9 | — | 8.0 | 8.5 | 9.2 | 9.2 | — | — |
| Gloss according to Lange (60° C.) | 81 | 83 | 79 | — | 75 | 71 | — | 91 | 90 | 89 | 85 | — | — |

Example 10: pot time 55 hrs, (+) 90 min
Additional columns (Pendulum hardness row continued): 75, 150, 60, 240; Xylene resistance: 5, 3; Scratch: 3, 3; Erichsen: 9.8; Gloss: 91

| | Hardening conditions | | | | | | | | |
|---|---|---|---|---|---|---|---|---|---|
| | room temperature | | 80° C. 30 min | | 140° C. 30 min | | pot time hrs. | (+) (min.) |
| Measurement in days | 1 | 7 | 1 | 7 | 1 | 7 | 16 | 45 |
| Pendulum hardness according to Konig (s) | 70 | 135 | 120 | 165 | 170 | 185 | | |
| Xylene resistance (min) | <1 | 2 | 4 | 6 | 2 | 7 | | |
| Scratch resistance | 5 | 3 | 3 | 2 | 2 | 2 | | |
| Erichsen depression (mm) | 7.0 | 6.6 | 6.8 | 7.0 | 6.0 | — | | |
| Gloss according to Lange (60° C.) | 63 | 81 | 84 | 87 | 79 | — | | |

Example 11 values (room temp / 80°C / 140°C, days 1 and 7): Pendulum 105, 170, 150, 175, 185; Xylene <1, 28, 20, 45, 50; Scratch 4, 3, 2, 2, 2; Erichsen 7.0, 7.5, 6.8, 6.9, 7.8; Gloss 88, 86, 85, 83, 85; pot time 90 hrs, (+) 180 min.

Example 12: Pendulum 70, 90, 160, 195, 210; Xylene <1, <1, 90, 120, 120; Scratch 5, 5, 2, 1.5, 0; Erichsen 10.1, 10.1, 6.8, 7.0, 6.5; Gloss 96, 99, 91, 89, 94; pot time 36 hrs, (+) 300 min.

Example 13: Pendulum 65, 120, 125, 145, 163; Xylene <1, <1, 2, 3, 4; pot time — .

Example 14: Pendulum 70, 186, 173, 218, 219; Xylene 16, 38, 30, 85, >120; pot time 16 hrs, (+) 75 min.

TABLE 4-continued

| (min) Scratch resistance | 5 | 4 | 4 | 3 | 3 | 5 | 3 | 1 | 1.5 | 0 |
|---|---|---|---|---|---|---|---|---|---|---|
| Erichsen depression (mm) | 8.0 | 8.5 | 8.1 | 7.8 | 8.2 | 9.0 | 9.5 | 8.7 | 8.3 | 7.9 |
| Gloss according to Lange (60° C.) | 92 | 88 | 96 | 96 | 102 | 92 | 88 | 87 | 84 | 81 |

(+) Tack-free drying time

TABLE 5

| No. | (a) | (b) |
|---|---|---|
| Anhydride mixture | 100 | 100 |
| Proportion | | |
| $R^1$ | Polyester | OH-Copolymer |
| Proportion | 79.4 | 127 |
| $H_2O$ T | — | 6.1 |
| Final acid number | 209 | 170 |
| DMF/$H_2O$ | | |
| n-Butanol | 203 | 166 |

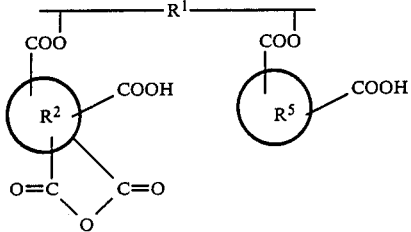

(I)

TABLE 6

| Example | 15 | 16 | 17 | 18 | 19 | 20 |
|---|---|---|---|---|---|---|
| Anhydride component (B) | (a) Sz $H_2O$) 209 (Butanol) 203 100 T | (b) Sz($H_2O$) 170 (Butanol) 166 100 T | (b) 100 T | (a) 100 T | (a) 100 T | (b) 100 T |
| Epoxy Compound (A) | I M.p. 68° C. EP 3.17 EP value 0.198 190 T | II M.p. 86° C. EP 2.06 EP value 0.129 230 T | I 101 T +Triglycidyl cyanurate 10 T | II 265 T epoxidised linseed oil, liquid EP 9.0 5 T | I 117 T +II 110 T | II 145 T |
| other resins | — | — | — | — | Hexamethoxy-methyl melamine M.p. 54° C. 3 T | Dimethylel urea M.p. 123° C. 7 T |

TABLE 7

| Hardening Conditions | 150° C. 30′ | 280° C. 90 s | 160° C. 30′ | 295° C. 60 s | 180° C. 20′ | 270° C. 90 s | 160° C. 30′ | 280° C. 30 s | 190° C. 30′ | 310° C. 30 s | 140° C. 30′ | 260° C. 120 s |
|---|---|---|---|---|---|---|---|---|---|---|---|---|
| Example | 15 | | 16 | | 17 | | 18 | | 19 | | 20 | |
| Pendulum hardness according to Konig (s) | 186 | 193 | 184 | 200 | 205 | 215 | 190 | 203 | 204 | 215 | 224 | 210 |
| Xylene resistance (min) | 4 | 10 | 10 | 15 | >60 | >60 | 20 | 18 | >60 | >60 | >120 | >120 |
| Scratch resistance | 2 | 2-3 | 2 | 1 | 0-1 | 1 | 1-2 | 1 | 0 | 0 | 0 | 0 |
| Impact depression inch/lb | 20 | 40 | 40 | 36 | 36 | 24 | 120 | 100 | 16 | 12 | 64 | 16 |
| Erichsen depression (min) | 9.8 | 9.2 | 9.2 | 8.9 | 9.7 | 8.4 | 9.6 | 9.3 | 8.3 | 8.0 | 9.6 | 8.9 |
| Gloss according to Lange (60° C.) | 92 | 90 | 94 | 94 | 89 | 94 | 96 | 92 | 84 | 80 | 84 | 76 | it is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A reactive hardenable polymer mixture which comprises:
   (A) at least one aliphatic epoxy compound having 2 to 6 oxirane groups; and
   (B) at least one polycarboxylic acid compound in the form of a component selected from the group consisting of:
   (a) at least one compound of Formula I:

wherein:
$R^1$ is a radical derived from at least one polymeric product containing hydroxy groups arranged along the backbone which product is selected from the group consisting of a polymerization and a condensation product and a combination thereof in the form of polyesters having a hydroxy number between 40 and 220, a polymer having a hydroxy number between 40 and 220 selected from the group consisting of a polymerization product of polyvinyl alcohol and, at least partially saponified copolymers of vinylacetate with at least one unsaturated monomer, a homopolymer of hydroxyalkylacrylate, methacrylate or maleinate and a copolymer of at least one of said hydroxyalkyl monomers with at least one olefinically unsaturated monomer; phenol resins having a hydroxy number between 150 and 300 and combinations thereof;

$R^2$ is derived from a radical selected from the group consisting of those of formula IIa and formula VI

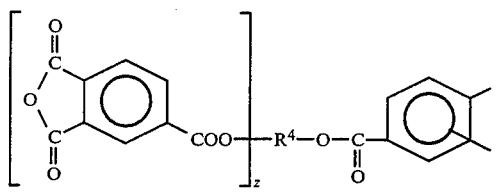

in which z is an integer from 1 to 4 inclusive:

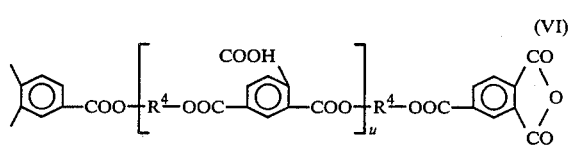

in which u is an integer from 1 to 8, inclusive, or the corresponding free acids;

wherein the bridging radical $R^4$ is (a) a bi- to pentavalent radical selected from the group consisting of an aliphatic hydrocarbon group having 1 to 28 carbon atoms, (b) radical (a) being at least once interrupted by oxygen-bridges or by —HC=CH—group, and (c) a radical (a) being substituted by an ester group having 1 to 6 carbon atoms, (d) a radical (a) being substituted by a COOH—group, (e) an aromatic group having 6 to 43 carbon atoms of at least one of formulae

  (XVI)

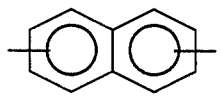  (XVII)

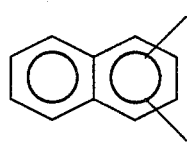  (XVIII)

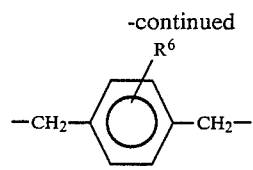  (XIX)

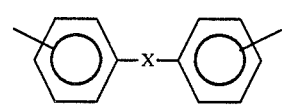  (XX)

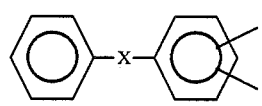  (XXI)

the aromatic radicals being unsubstituted or substituted by at least one radical $R^6$ selected from the group consisting of alkyl, alkoxy each having 1 to 6 carbon atoms and halogen, furthermore $R^4$ is (f) a piperazine group, wherein in formulae XX and XXI the divalent radical X is a group of one of formulae

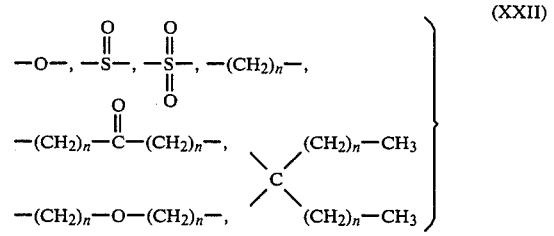  (XXII)

wherein n is an integer from 1 to 8; $R^5$ is a radical of an at least dibasic cyclic carboxylic acid having at least one COOH—group in an ortho-position to the ester bond and $R^5$ may also be as defined for $R^2$;

(b) at least one compound of formulae (IIa) or (VI) together with at least one of the OH—group containing compounds from which the above defined group $R^1$ is derived;

(c) at least one compound corresponding to formula (I) as defined under (a) but with the proviso that the anhydride groups are replaced at least partially by a free acid or ester group or by both;

(d) at least one compound as defined under (b) wherein the anhydride groups of the polycarboxylic acid compounds are replaced at least partially by a free acid or at least partially by an ester group or by both; and (e) any combination of (a) to (d).

2. A composition as claimed in claim 1 containing additionally at least one polycarboxylic anhydride, being not bound to the chain of the polymerisation or condensation resin and containing at least one group of one of the formulae

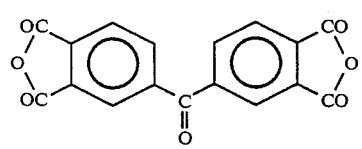  (IV)

-continued

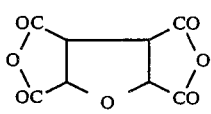 (V) 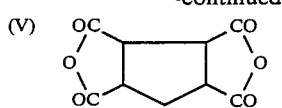 (Vb)

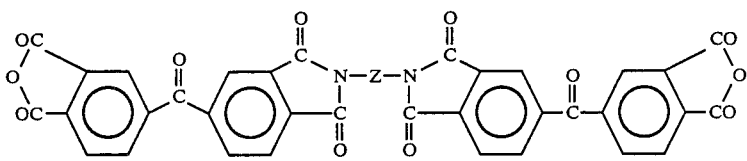 (VIII)

and trimellitic anhydride, wherein Z is $(CH_2)_m$, wherein m is an integer from 2 to 8, or z has the meaning of one of the formulae

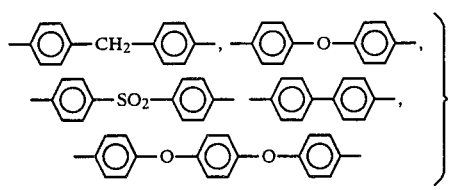 (X)

3. An acidic polymer selected from the group consisting of:
(a) at least one compound of Formula I:

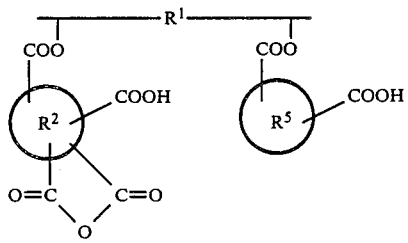 (I)

wherein:
$R^1$ is a radical derived from at least one polymeric product containing hydroxy groups arranged along the backbone which product is selected from the group consisting of a polymerization and a condensation product and a combination thereof in the form of polyesters having a hydroxy number between 40 and 220, a polymer having a hydroxy number between 40 and 220 selected from the group consisting of a polymerization product of polyvinyl alcohol, at least partially saponified copolymers of vinylacetate with at least one unsaturated monomer, a homopolymer of hydroxyalkyl acrylate, meth-acrylate or maleinate and a copolymer of at least one of said hydroxyalkyl monomers with at least one olefinically unsaturated monomer; phenol resins having a hydroxy number between 150 and 300 and combinations thereof;
$R^2$ is derived from a radical selected from the group consisting of those of formula IIa and formula VI

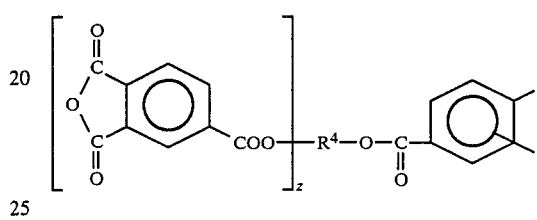 (IIa)

in which z is an integer from 1 to 4 inclusive:

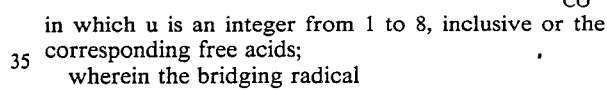 (VI)

in which u is an integer from 1 to 8, inclusive or the corresponding free acids;
wherein the bridging radical
$R^4$ is (a) a bi- to pentavalent radical selected from the group consisting of an aliphatic hydrocarbon group having 1 to 28 carbon atoms, (b) radical (a) being at least once interrupted by oxygen-bridges or by —HC=CH—group, and (c) a radical (a) being substituted by an ester group having 1 to 6 carbon atoms, (d) a radical (a) being substituted by a COOH—group, (e) an aromatic group having 6 to 43 carbon atoms of at least one of formulae

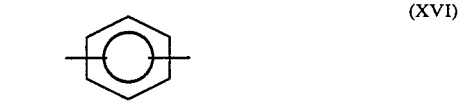 (XVI)

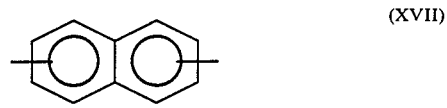 (XVII)

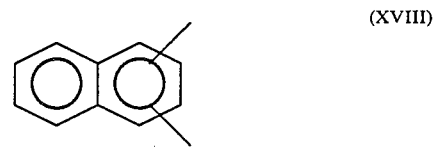 (XVIII)

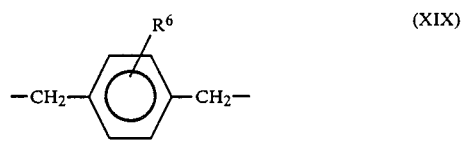 (XIX)

-continued

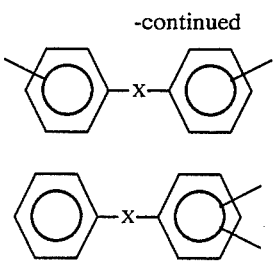

the aromatic radicals being unsubstituted or substituted by at least one radical $R^6$ selected from the group consisting of alkyl, alkoxy each having 1 to 6 carbon atoms and halogen, furthermore $R^4$ is (f) a piperazine group, wherein in formulae XX and XXI the divalent radical X is a group of one of formulae

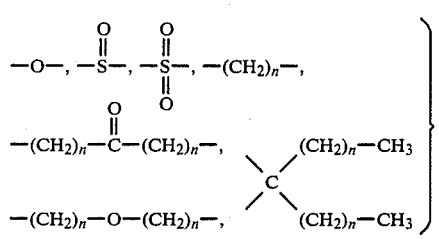

wherein n is an integer from 1 to 8; $R^5$ is a radical of an at least dibasic cyclic carboxylic acid having at least one COOH—group in an ortho-position to the ester bond and $R^5$ may also be as defined for $R^2$;

(b) at least one compound corresponding to formula (I) as defined under (a) but with the proviso that the anhydride groups are replaced at least partially by a free acid or ester group or by both.

4. A process for the preparation of hardened products from the composition claimed in claim 1 wherein the composition is cured at a temperature of from 0° to 350° C.

5. A process as claimed in claim 4, wherein curing is carried out at a temperature in the range from 20° to 80° C.

6. A composition as claimed in claim 1 wherein the ratio of the free carboxylic groups of the polycarboxylic acid compounds including the free carboxylic groups of the polycarboxylic acid compounds not bound to $R^1$ in cases (b) to (e) to the epoxy equivalent in the epoxy compounds is between 1:5 and 5:1 and the ratio of the anhydride groups of the polycarboxylic acid units (B) of compound (a) or in cases in (b) to (c) of the polycarboxylic derivatives not bound to $R^1$ to the off-groups of the epoxy compound is between 20:1 and 1:20.

7. A composition as claimed in claim 1 containing at least one liquid component (A) or (B).

8. A composition as claimed in claim 1 additionally containing up to 30% by weight of the total solids content of at least one heat-hardenable synthetic resin containing hydroxy groups.

9. A composition as claimed in claim 1 containing additionally up to 5% by weight, referred to the total solids content, of a catalyst.

10. A composition as claimed in claim 1 being in powdered form and having a softening point between 40° and 200° C. (according to Durrans) and a glass transition temperature between 22° and 100° C.

11. A composition as claimed in claim 1 wherein the COOH—groups of component (B) are present in the form of a metal salt or a quaternary ammonium salt and in an amount between 0.1 and 20%, referred to the COOH—group equivalents.

12. A process for the preparation of hardened products as claimed in claim 4 wherein the composition is cured between 20° and 210° C. in the presence of a solvent.

13. A process for the preparation of hardened products as claimed in claim 4 wherein a powdered composition is hardened between 80° and 310° C.

14. A reactive hardenable polymer mixture which comprises:

(A) at least one aliphatic epoxy compound having 2 to 6 oxirane groups; and (B) at least one polycarboxylic acid compound in the form of a component selected from the group consisting of:

at least one compound of Formula I:

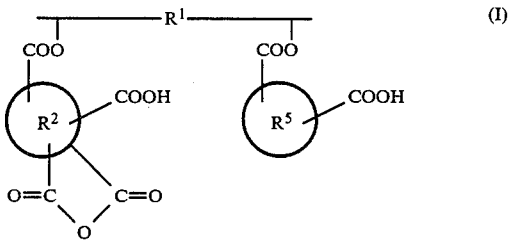

wherein:

$R^1$ is a polymer residue;

$R^2$ is derived from a radical selected from the group consisting of those of formula IIa and formula VI

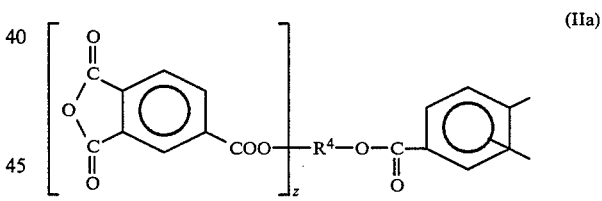

in which z is an integer from 1 to 4 inclusive:

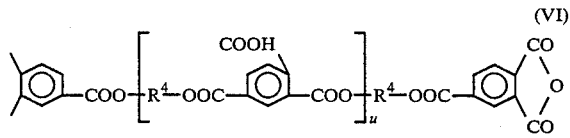

in which u is an integer from 1 to 8, inclusive or the corresponding free acids;

wherein the bridging radical $R^4$ is (a) a bi- to pentavalent radical selected from the group consisting of an aliphatic hydrocarbon group having 1 to 28 carbon atoms, (b) radical (a) being at least once interrupted by oxygen-bridges or by —HC≡CH—group, and (c) a radical (a) being substituted by an ester group having 1 to 6 carbon atoms, (d) a radical (a) being substituted by a COOH—group, (e) an aromatic group having 6 to 43 carbon atoms of at least one of formulae

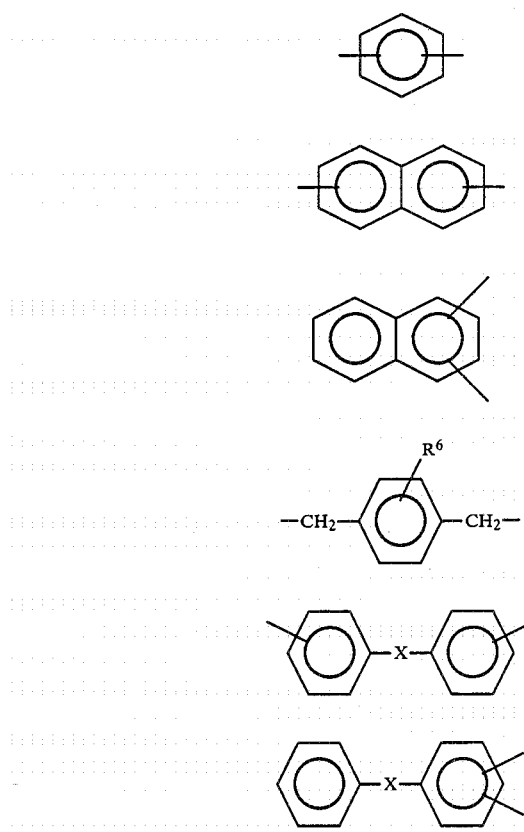

(XVI)

(XVII)

(XVIII)

(XIX)

(XX)

(XXI)

the aromatic radicals being unsubstituted or substituted by at least one radical R⁶ selected from the group consisting of alkyl, alkoxy each having 1 to 6 carbon atoms and halogen, furthermore $R^4$ is (f) a piperazine group, wherein in formulae XX and XXI the divalent radical X is a group of one of formulae

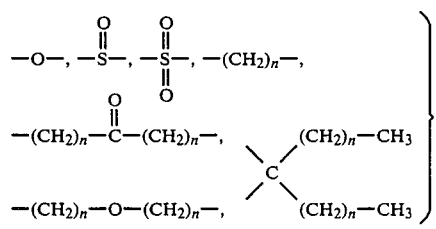

(XXII)

wherein n is an integer from 1 to 8; $R^5$ is a radical of an at least dibasic cyclic carboxylic acid having at least one COOH—group in an ortho-position to the ester bond and $R^5$ may also be as defined for $R^2$.

15. A reactive hardenable polymer mixture which comprises:

(A) at least one aliphatic epoxy compound having 2 to 6 oxirane groups; and (B) at least one polycarboxylic acid compound in the form of a component selected from the group consisting of:

(a) at least one compound of Formula I:

(I)

wherein:

$R^1$ is a radical derived from at least one polymeric product containing hydroxy groups arranged along the backbone which product is selected from the group consisting of a polymerization and a condensation product and a combination thereof in the form of polyesters having a hydroxy number between 40 and 220, a polymer having a hydroxy number between 40 and 220 selected from the group consisting of a polymerization product of polyvinyl alcohol, at least partially saponified copolymers of vinylacetate with at least one unsaturated monomer, a homopolymer of hydroxyalkyl acrylate, meth-acrylate or maleinate and a copolymer of at least one of said hydroxyalkyl monomers with at least one olefinically unsaturated monomer; phenol resins having a hydroxy number between 150 and 300 and combinations thereof;

$R^2$ is derived from a radical selected from the group consisting of those of formula IIa and formula VI (IIa)

in which z is an integer from 1 to 2 inclusive:

(VI)

in which u is an integer from 1 to 8, inclusive, or the corresponding free acids;

wherein the bridging radical $R^4$ is (a) a bi- to trivalent radical selected from the group consisting of an aliphatic hydrocarbon group having 2 to 8 carbon atoms, (b) radical (a) being at least once interruped by oxygen-bridges or by —HC=CH—group;

$R^5$ is a radical of an at least dibasic cyclic carboxylic acid having at least one COOH—group in an ortho-position to the ester bond and $R^5$ may also be as defined for $R^2$;

(b) at least one compound of formulae (IIa) or (VI) together with at least one of the OH-group containing compounds from which the above defined group $R^1$ is derived;

(c) at least one compound corresponding to formula (I) as defined under (a) but with the proviso that the anhydride groups are replaced at least partially by a free acid or ester group or by both;

(d) at least one compound as defined under (b) wherein the anhydride groups of the polycarboxylic acid compounds are replaced at least partially by a free acid or at least partially by an ester group or by both; and (e) any combination of (a) to (d).

16. An acidic polymer selected from the group consisting of:

(a) at least one compound of Formula I:

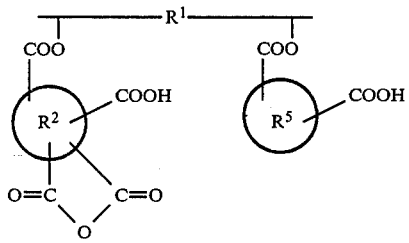
(I)

wherein:

$R^1$ is a radical derived from at least one polymeric product containing hydroxy groups arranged along the backbone which product is selected from the group consisting of a polymerization and a condensation product and a combination thereof in the form of polyesters having a hydroxy number between 40 and 220, a polymer having a hydroxy number between 40 and 220 selected from the group consisting of a polymerization product of polyvinyl alcohol, at least partially saponified copolymers of vinylacetate with at least one unsaturated monomer, a homopolymer of hydroxyalkyl acrylate, meth-acrylate or maleinate and a copolymer of at least one of said hydroxyalkyl monomers with at least one olefinically unsaturated monomer; phenol resins having a hydroxy number between 150 and 300 and combinations thereof;

$R^2$ is derived from a radical selected from the group consisting of those of formula IIa and formula VI

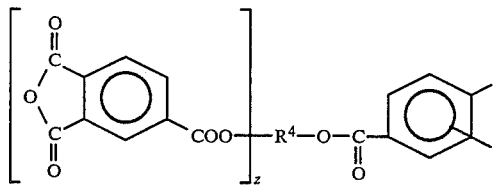
(IIa)

in which z is an integer from 1 to 2 inclusive:

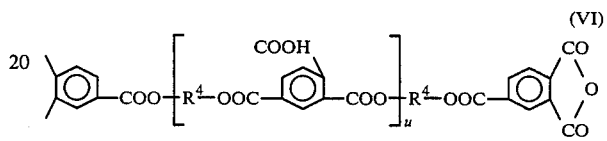
(VI)

in which u is an integer from 1 to 8, inclusive, or the corresponding free acids:

wherein the bridging radical $R^4$ is (a) a bi- to trivalent radical selected from the group consisting of an aliphatic tydrocarbon group having 2 to 8 carbon atoms, (b) radical (a) being at least once interrupted by oxygen-bridges or by —HC=CH—group; $R^5$ is a radical of an at least dibasic cyclic carboxylic acid having at least one COOH—group in an ortho-position to the ester bond and $R^5$ may also be as defined for $R^2$;

(b) at least one compound corresponding to formula (I) as defined under (a) but with the proviso that the anhydride groups are replaced at least partially by a freee acid or ester group or by both.

* * * * *